(12) United States Patent
Zhao et al.

(10) Patent No.: US 10,824,480 B2
(45) Date of Patent: Nov. 3, 2020

(54) METHOD AND MACHINE FOR APPLICATION MIGRATION

(71) Applicant: EMC IP Holding Company LLC, Hopkinton, MA (US)

(72) Inventors: Junping Zhao, Beijing (CN); Fan Guo, Shanghai (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 16/162,469

(22) Filed: Oct. 17, 2018

(65) Prior Publication Data

US 2019/0121662 A1    Apr. 25, 2019

(30) Foreign Application Priority Data

Oct. 20, 2017  (CN) .......................... 2017 1 0983298

(51) Int. Cl.
    *G06F 9/50*     (2006.01)
    *G06F 9/48*     (2006.01)
    *G06F 9/52*     (2006.01)

(52) U.S. Cl.
    CPC ............ *G06F 9/5088* (2013.01); *G06F 9/485* (2013.01); *G06F 9/4856* (2013.01); *G06F 9/5083* (2013.01); *G06F 9/52* (2013.01); *G06F 9/522* (2013.01); *G06F 9/5016* (2013.01)

(58) Field of Classification Search
    None
    See application file for complete search history.

(56) References Cited

U.S. PATENT DOCUMENTS

| | | | | |
|---|---|---|---|---|
| 2017/0132744 A1* | 5/2017 | Wilt | ..................... | G06F 9/5044 |
| 2017/0132745 A1* | 5/2017 | Wilt | ..................... | G06F 9/4856 |
| 2017/0132746 A1* | 5/2017 | Wilt | ..................... | G06F 9/45558 |
| 2017/0132747 A1* | 5/2017 | Wilt | ..................... | G06F 9/5044 |

OTHER PUBLICATIONS

Deng, et al., "Toward Middleware-based Online Application Migration", 2009, IEEE, pp. 222-227. (Year: 2009).*

* cited by examiner

*Primary Examiner* — Qing Yuan Wu
(74) *Attorney, Agent, or Firm* — Ryan, Mason & Lewis, LLP (57) ABSTRACT

Embodiments provide a method and machine for application migration. In an embodiment, a first descriptor associated with a first runtime environment of an application executed on a first dedicated processing unit is obtained from the first dedicated processing unit. In response to determining that the application is to be migrated from the first dedicated processing unit to the second dedicated processing unit during the execution, the second dedicated processing unit is caused to create a second descriptor associated with a second runtime environment for the application, executed on the second dedicated processing unit. Subsequently, the second descriptor is obtained from the second dedicated processing unit and a first mapping from the first descriptor to the second descriptor is established for re-directing, to the second dedicated processing unit, the request from the application to the first dedicated processing unit. A corresponding machine for implementing the method is further disclosed.

20 Claims, 8 Drawing Sheets

METHOD AND MACHINE FOR APPLICATION MIGRATION

RELATED APPLICATIONS

This application claims priority from Chinese Patent Application Number CN201710983298.6, filed on Oct. 20, 2017 at the State Intellectual Property Office, China, titled "METHOD AND MACHINE FOR APPLICATION MIGRATION" the contents of which are incorporated herein by reference in their entirety.

FIELD

Embodiments of the present disclosure generally relate to computer technology, and more specifically, to a method and machine for application migration.

BACKGROUND

Nowadays more and more public clouds are providing graphics processing unit (GPU) instances for data processing and analyzing tasks in emerging computing scenarios, such as high-performance computing (HPC), machine learning (ML) or deep learning (DL), artificial intelligence (AI) and the like. These GPU instances can be configured flexibly and scaled easily so as to provide more elastic computing services for local clients or computing devices.

In order to enable cloud GPU instances to better serve the above emerging computing scenarios, an intelligent and optimized infrastructure has been provided, in which a modern accelerator, such as a GPU accelerator and a field programmable gate array (FPGA) accelerator, like a central processing unit (CPU) and a storage device, is allowed to serve as a component of the infrastructure and become the first-class manageable resource in a modern data center or cloud. In particular, a GPU as a service (GPUaaS) solution is further provided which may be implemented based on an architecture of remote direct memory access (RDMA) or transmission control protocol (TCP) and based on client-server software. This solution can provide, to a client, pooled and remote virtualized CPU resources on a remote server.

In such a GPU deployment scenario, a plurality of applications from the same or different clients may be scheduled to be executed in the same GPU. In this case, if the application in execution can migrate dynamically between GPUs by considering GPU load, the quality of service (QoS) requirement of the application, or resource utilization and other factors, the overall performance of the system may be improved significantly.

SUMMARY

In general, embodiments of the present disclosure provide a method and machine for application migration.

In a first aspect, embodiments of the present disclosure provide a method of application migration. The method comprises: obtaining, from a first dedicated processing unit, a first descriptor associated with a runtime environment of an application executed on the first dedicated processing unit; in response to determining that the application is to be migrated from the first dedicated processing unit to a second dedicated processing unit during the execution, causing the second dedicated processing unit to create a second descriptor associated with a runtime environment for the application; obtaining the second descriptor from the second dedicated processing unit; and establishing a first mapping from the first descriptor to the second descriptor to re-direct, to the second dedicated processing unit, a request from the application to the first dedicated processing unit.

In a second aspect, embodiments of the present disclosure provide a machine for application migration. The machine comprises a central processing unit and a memory storing instructions, the instructions, when executed by the central processing unit, cause the central processing unit to implement the method according to the first aspect.

In a third aspect, embodiments of the present disclosure provide a non-transient computer readable medium having machine executable instructions stored tangibly thereon. The machine executable instructions, when executed in the machine, cause the machine to perform the method according to the first aspect.

It is to be understood that the content described in the Summary is not intended to identify key features or essential features of the claimed subject matter, nor is it intended to be used to limit the scope of the claimed subject matter. Other features of the present disclosure will be more comprehensible with the following description.

BRIEF DESCRIPTION OF THE DRAWINGS

Through the following detailed description with reference to the accompanying drawings, the above and other features, advantages and aspects of embodiments of the present disclosure will become more apparent. In the drawings, the same or similar reference signs refer to the same or similar elements, in which.

DETAILED DESCRIPTION OF EMBODIMENTS

Embodiments of the present disclosure will be described in the following in more detail with reference to the drawings. Although some embodiments of the present disclosure are illustrated in the drawings, it is to be understood that the present disclosure may be implemented in various manners, not limited to the embodiments illustrated herein. On the contrary, these embodiments are provided to make the present disclosure more thorough and complete. It is to be understood that the drawings and embodiments of the present disclosure are only for the purpose of illustration, rather than limiting the scope of protection of the present disclosure.

As used herein, the term "processing unit" refers to any suitable physical or virtual processor that can execute various processing based on program code instructions. The processing unit may include one or more cores. In the case where a plurality of cores is included, the plurality of cores may operate in parallel so as to improve the processing efficiency of the processing unit. In the context of the present disclosure, the processing unit may include a dedicated processing unit which includes, for instance, a Graphics Processing Unit (GPU), a Field-programmable Gate Array (FPGA), an Application-specific Integrated Circuit (ASIC) and the like, and a general-purpose processing unit which includes, for instance, a Central Processing Unit (CPU). For the purpose of discussion, some embodiments will be described by taking a GPU as an example of the dedicated processing unit.

As used herein, the term "includes" and its variants are to be read as open-ended terms that mean "includes, but is not limited to." The term "based on" is to be read as "based at least in part on." The term "one embodiment" is to be read as "at least one embodiment"; the term "another embodiment" is to be read as "at least one another embodiment." The following text may also contain other explicit or implicit definitions.

Figure 1:
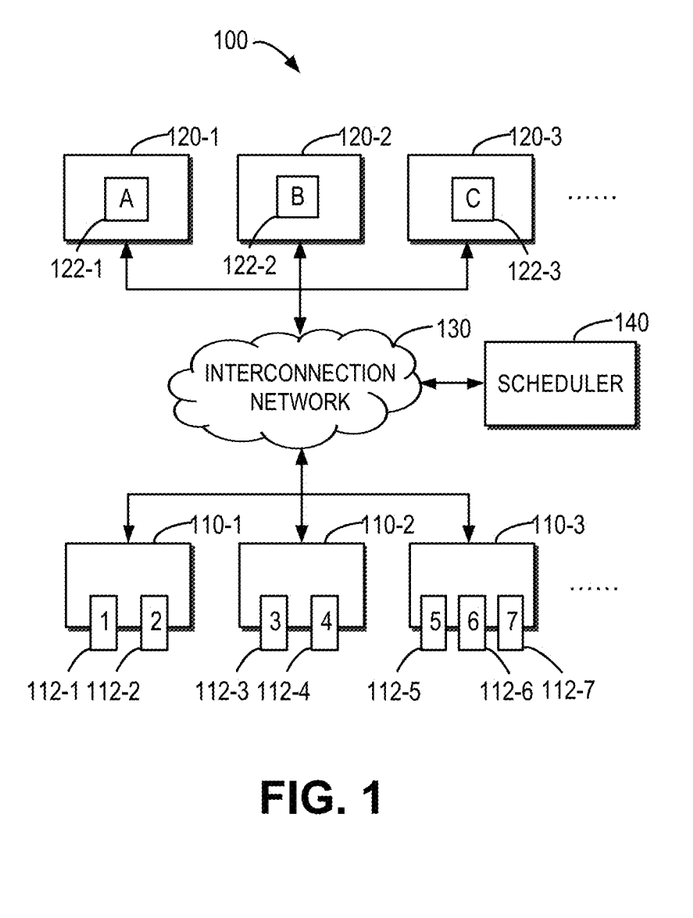
FIG. 1 illustrates a schematic diagram of a computing system in which embodiments of the present disclosure may be implemented.

As described above, a solution has been proposed to deploy a GPU in a data center or cloud for remote use by a client. FIG. 1 illustrates a schematic diagram of an example computing system 100 employing the above solution in which embodiments of the present disclosure may be implemented. A plurality of machines 110-1, 110-2, 110-3 and the like (hereinafter collectively or individually referred to as a machine 110) for executing an application are deployed in the computing system 100. The machine 110 may be a physical or virtual machine. For example, the machine 110 may be a logic, container or virtual machine, or a physical server or computing device and the like, which are deployed in a data center or a private or public cloud. Each machine 110 may have one or more processing units, including dedicated processing units, such as GPUs, FPGAs, ASICs and the like, and general-purpose processing units, such as CPUs.

In the example shown in FIG. 1, the machine 110-1 has two dedicated processing units 112-1 and 112-2, the machine 110-2 has two dedicated processing units 112-3 and 112-4, and the machine 110-3 has three dedicated processing units 112-5, 112-6 and 112-7. These dedicated processing units are collectively or individually referred to as a dedicated processing unit 112. In addition to the dedicated processing unit 112, the machine 110 may further include one or more general-purpose processing units (not shown).

FIG. 1 further shows three clients 120-1, 120-2 and 120-3 (hereinafter collectively or individually referred to as a client 120) which have, respectively, applications 122-1, 122-2 and 122-3 (hereinafter collectively or individually referred to as an application 122) to be executed. The client 120 may be any terminal device, computer or server. The application 122 may be any application executable on the processing unit, which may be designed to perform corresponding data processing or analyzing tasks. As an example, the application 122 may perform data processing or analyzing tasks related to high-performance computing (HPC), machine learning (ML) or deep learning (DL) and artificial intelligence, among others.

In order to execute these applications quickly and efficiently and/or retain local processing resources, the client 120 may request the dedicated processing unit 112 of the machine 110 to execute these applications 122. In this implementation, the client 120 may be connected to one or more machines 110 via an interconnection network 130 and switch the application 122 to one or more dedicated processing units 112 of the machine 110 for execution. Depending on the interfaces enabled by the client 120, the machine 110 and/or the dedicated processing unit 112, the interconnection network 130 may enable different types of wired or wireless connections based on various network transmission technologies, such as remote direct memory access (RDMA) and transmission control protocol (TCP).

In the computing system 100, the plurality of dedicated processing units 112 may be pooled or virtualized for use by a plurality of clients 120 or a plurality of applications 122 therein. In the client 120, a virtual processing unit execution may be presented for executing the application 122 of the client 120 while the application 122 is actually executed by one or more dedicated processing units 112 at the machine 110 side. The client 120 may also require use of the dedicated processing unit 112 as needed. The computing system 100 further includes a scheduler 140 for scheduling a plurality of applications 122 of the client 120 to be executed on one or more dedicated processing units 112 of one or more machines 110. Moreover, the scheduler 140 may also schedule a plurality of applications 122 from the same or different clients 120 to run on the same dedicated processing unit 112.

It is to be understood that the device and/or arrangement shown in FIG. 1 is only an example. In other embodiments, the computing system 100 may include any number of machines 110 and clients 120. Each machine 110 may be installed with any suitable number of dedicated processing units 112, and each client 120 may have a plurality of applications 122 to be executed. In addition, although illustrated separately, the scheduler 140 may be implemented by other devices independent of the machine 110 in actual applications or implemented partially or fully on one or more machines 110.

In the computing system 100, the scheduler 140 may schedule the applications 122 across a plurality of dedicated processing units 112 to achieve the dynamic load balance of the dedicated processing units 112, thereby improving the overall performance of the system. The scheduler 140 may further integrate a plurality of applications 122 dynamically into a single dedicated processing unit 112 to improve the utilization of the dedicated processing unit 112, thereby reducing system costs. Moreover, the scheduler 140 may also provide the scheduling of the applications 122 based on QoS requirements so as to reduce the impact of the low-level applications on other high-level applications according to service level agreement (SLA), for example.

Conventionally, the scheduling of the application 122 across the dedicated processing units 112 may be performed only before, instead of during, the execution of the application 122. It has been found that the execution instruction from the application 122, the resource demands of the application 122 or the execution time of the application 122 may be predicted to achieve the above scheduling. However, this is very difficult.

To at least partially solve the above and other potential problems, embodiments of the present disclosure provide a solution of migrating an application during the execution of the application. Specifically, embodiments of the present disclosure provide a migration module deployed in a machine. When the application 122 is to be migrated between the dedicated processing units 112 in the machine 110, the migration module establishes a mapping between a descriptor associated with the runtime environment of the application 122 in the source dedicated processing unit and a descriptor associated with the runtime environment created by the target dedicated processing unit for the application 122. In the context of the present disclosure, the descriptor is also referred to as handle which denotes a reference object visible to the client and associated with the operation of the application program interface (API). Examples of a descriptor include, but are not limited to, device descriptors used by the application 122 in execution, flow descriptors, cuBlas handle, cuDNN handle and the like.

By means of this mapping, the request from the application 122 to the source dedicated processing unit may be re-directed to the target dedicated processing unit so that the application 122 in execution can be migrated from one dedicated processing unit to another dedicated processing unit transparently with no need to change the application.

The migration module may be implemented by hardware, software or a combination thereof. As an example, the migration module may be implemented by host-based middleware on the hardware drive so as to perform migration using the hardware function exposed from the drive program/library/API of the dedicated processing unit. This approach does not need to amend the internal mechanism of the hardware and is more flexible.

Figure 2:
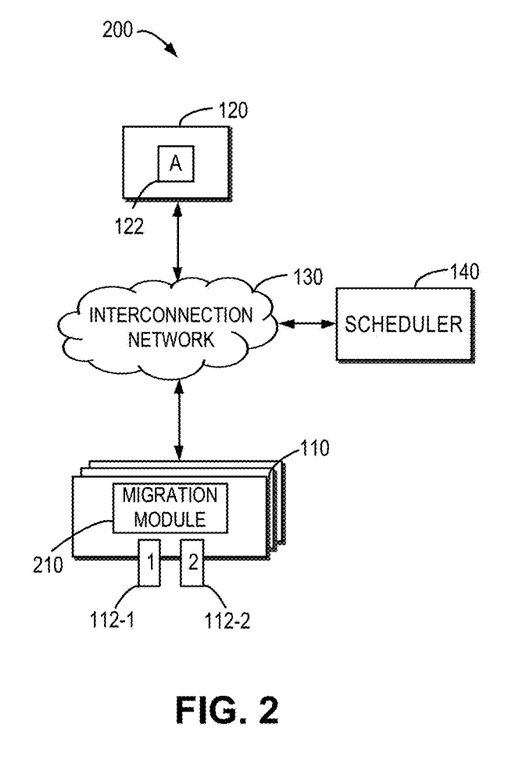
FIG. 2 illustrates a schematic diagram of a computing system in accordance with some embodiments of the present disclosure.

Basic principles and several example implementations of embodiments of the present disclosure will be described below with reference to FIGS. 2 and 3. FIG. 2 shows an example computing system 200 in accordance with some embodiments of the present disclosure. It is to be understood that the computing system 200 is an example implementation of the computing system 100. In the computing system 200, when the application 122 in the client 120 is scheduled by the scheduler 140 to be executed on the dedicated processing unit 112-1 (for the purpose of discussion, referred to as a first dedicated processing unit 112-1) in machine 110 from the beginning of the execution.

After it is determined based on, for example, a migration request from the scheduler 140 that the application 122 is to be migrated to the dedicated processing unit 112-2 (for the purpose of discussion, referred to as a second dedicated processing unit 112-2) during the execution, the migration module 210 in the machine 110 establishes a mapping (referred to as "first mapping") between a descriptor (referred to as a "first descriptor") associated with the runtime environment of the application 122 on the first dedicated processing unit 112-1 and a descriptor (referred to as a "second descriptor") associated with the runtime environment created by the second dedicated processing unit 112-2 for application 122. With the first mapping, the migration module 210 may re-direct the request of the application 122 from the first dedicated processing unit 112-1 to the second dedicated processing unit 112-2.

Figure 3:
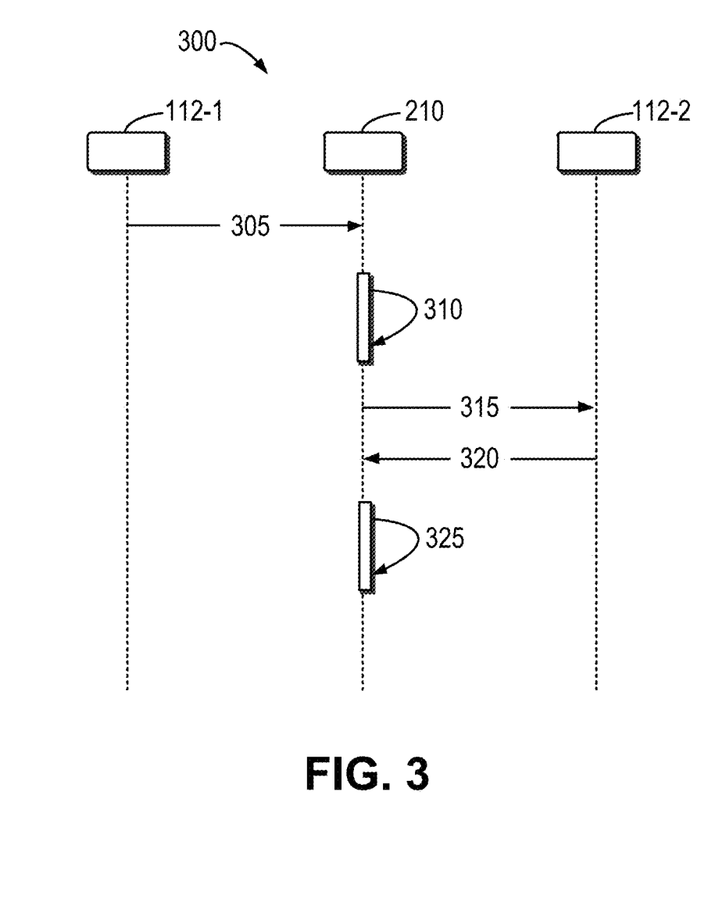
FIG. 3 illustrates a communicating and processing process of a migration module and dedicated processing units in a machine in accordance with some embodiments of the present disclosure.

Reference will be made to FIG. 3 to depict a communicating and processing process of the migration module 210 and the first and second dedicated processing units 112-1 and 112-2 in detail. In the process 300 shown in FIG. 3, the migration module 210 obtains (305) the first descriptor associated with the runtime environment of the application 122 on the first dedicated processing unit 112-1. The above obtaining of the first descriptor may be implemented by the migration module 210 in any suitable manner.

As an example, after the execution of the application 122, the migration module 210 may periodically transmit to the first dedicated processing unit 112-1 a request for the first descriptor describing the current runtime environment of the application 122. In response to receiving the request, the first dedicated processing unit 112-1 may return the first descriptor to the migration module 210. Alternatively, the first dedicated processing unit 112-1 may automatically transmit the first descriptor to the migration module 210 periodically without receiving the request from the migration module 210.

In some embodiments, the migration module 210 may store the obtained first descriptor into the storage device of the machine 110, for instance, into a host memory, to subsequently establish the first mapping to the second descriptor. Embodiments in this regard will be depicted in the following paragraphs.

If the migration module 210 determines (310) that the application 122 is to be migrated from the first dedicated processing unit 112-1 to the second dedicated processing unit 112-2 during the execution, the migration module 210 causes (315) the second dedicated processing unit 112-2 to create a second descriptor associated with the runtime environment for the application. As described above, the migration module 210 may make a decision to perform the above migration, for instance, in response to receiving a migration request from the scheduler 140. This migration request may indicate the application to be migrated and the migration destination. Alternatively, the migration module 210 may determine by itself whether to perform the migration by considering the load condition or resource utilization of the dedicated processing unit or the QoS requirement of the application.

After the migration module 210 determines (310) to perform the migration of the application 122, the migration module 210 may transmit a request for creating the second descriptor to the second dedicated processing unit 112-2. In response to receiving the request, the second dedicated processing unit 112-2 may create the second descriptor for the application 122.

Next, the migration module 210 obtains (320) the second descriptor from the second dedicated processing unit 112-2 and establishes (325) the first mapping of the first descriptor to the second descriptor. In the embodiment where the migration module 210 stores the first descriptor obtained from the first dedicated processing unit 112-1 into the memory, the migration module 210 may read the first descriptor from the memory after obtaining the second descriptor and then establish the first mapping of the first descriptor to the second descriptor.

With the established first mapping, the migration module 210 may re-direct, to the second dedicated processing unit 112-2, the request from the application 122 to the first dedicated processing unit 112-1. For example, after the first mapping is established (325), the migration module 210 may determine whether to intercept the request from the application 122 to the first dedicated processing unit 112-1. If such a request is intercepted, the migration module 210 may re-direct the request to the second dedicated processing unit 112-2 based on the first mapping.

In some embodiments, to further reduce the impact on the application 122 in execution, the migration module 210 may intercept the request of the application 122 to the first dedicated processing unit 112-1 immediately after determining (310) that the application 122 is to be migrated and freeze the intercepted request. For example, the migration module 210 may store all the intercepted requests in the form of a queue in a public storage area of the host memory of the machine 110 or in a public storage device and cause the first dedicated processing unit 112-1 not to process the requests. After the first mapping is established (325), the migration module 210 may forward the frozen requests to the second dedicated processing unit 112-2. Before this, any request from the application 122 is blocked so as to further reduce impact of the migration operation on the application 122.

To enable the execution of the application 122, in addition to creating the descriptors associated with the runtime environment, such as device descriptors, flow descriptors, cuBlas handle, cuDNN handle and the like, the dedicated processing unit 112 further needs to create a context for the application 122 during the initialization procedure before the execution of the application 122. In some embodiments, after determining (310) that the application 122 is to be migrated to the second dedicated processing unit 112-2, the migration module 210 may cause the second dedicated processing unit 112-2 to create a context for the application 122, for example, by transmitting a request to the second dedicated processing unit 112-2.

In some embodiments, when the migration of the application 122 is performed, the migration module 210 may further perform explicit memory replication or prefetching to migrate data associated with the application 122 from a memory (referred to as a "first memory") for the first dedicated processing unit 112-1 to a memory (referred to as a "second memory") for the second dedicated processing unit 112-2. In some embodiments, before the memory replication or prefetching is performed, the migration module 210 may cause the first dedicated processing unit 112-1 to synchronize a plurality of threads associated with the application 122, thereby further reducing the impact of the data migration on the execution of application 122.

Generally, an application executed in a dedicated processing unit, such as the GPU, includes hundreds of threads, the states of which are reflected or recorded in the related register or first-level/second-level (L1/L2) cache, and big data may be stored in a GPU dynamic random access memory (GPU-DRAM). Moreover, the data set for calculating input data and intermediate results stored in a GPU global memory, such as a double data rate (DDR) memory, may be relatively greater, for example, several GBs (even up to 16 GB). Conventionally, it is very difficult to capture all the states in the lack of a local support in a hardware level.

According to some embodiments of the present disclosure, the migration module 210 may create a synchronization barrier for the first dedicated processing unit 112-1 to cause the first dedicated processing unit 112-1 to perform the synchronization of threads. For example, the migration module 210 may create the synchronization barrier for the first dedicated processing unit 112-1 through API, such as cuSyncThread( ) or cuSyncCtx( ) so as to force a plurality of threads of the application 122 to run to a certain "synchronization point." Such synchronization belongs to a blocking operation. After the above synchronization operation is performed, all the threads reach a consistent state. The related data are stored in the first memory of the first dedicated processing unit 112-1. Accordingly, after the synchronization is completed, the migration module 210 may migrate the related data in the first memory of the first dedicated processing unit 112-1 into the second memory of the second dedicated processing unit 112-2.

In some embodiments, before the data migration is performed, the migration module 210 may determine the size of a storage area (referred to as a "first storage area") for storing the application-related data in the first memory. For example, the migration module 210 may track the allocation and idleness of the first memory by interacting with the first dedicated processing unit 112-1 to determine the size of the first storage area.

Then, the migration module 210 may cause the second dedicated processing unit 112-2 to allocate, based on the size of the first storage area, a corresponding storage area (referred to as a "second storage area") in the second memory to store the application-related data. In some embodiments, the second dedicated processing unit 112-2 may allocate the second storage area with the same size as the first storage area. For example, after allocating the starting address of the second storage area, the second dedicated processing unit 112-2 may allocate the same offset for the second storage area as the first storage area. In some other embodiments, the second storage area allocated by the second dedicated processing unit 112-2 may be greater than the first storage area to further store the related data generated when the application 122 is executed on the second dedicated processing unit 112-2.

After it is determined that the allocation of the second storage area is completed (for example, by interacting with the second dedicated processing unit 112-2), the migration module 210 may migrate data from the first storage area to the second storage area. As an example, the migration module 210 may read the data from the first storage area via an API such as memcpyDeviceToHost( ) and then write the data into the second storage area via memcpyHostToDevice ( ).

Alternatively, in the case that the machine 110 and the first and second dedicated processing units 112-1 and 112-2 enable peer-to-peer (P2P) communication between dedicated processing units, if the first and second dedicated processing units 112-1 and 112-2 have already established connection via, for example, a Peripheral Component Interconnect Express (PCIe) switch, the migration module 210 may migrate the data directly from the first memory of the first dedicated processing unit 112-1 to the second memory of the second dedicated processing unit 112-2 via an API, such as memcpyP2P(targetGPUAddr, srcGPUAddr, size). In this way, CPU and intermediate replication can be bypassed, thereby further improving the system performance.

In some embodiments, the migration module 210 may create a mapping between the storage addresses of the first storage area and the second storage area to re-direct, to the second storage area, a request from the application 122 to access the first storage area. For example, the migration module 210 may obtain a storage address (referred to as a "first storage address") associated with the first storage area from the first dedicated processing unit 112-1 and a second storage address associated with the second storage area from the second dedicated processing unit 112-2. Then, the migration module 210 may establish a mapping (referred to as a "second mapping") from the first storage address to the second storage address. With the second mapping, the migration module 210 may re-direct, to the second storage area of the second dedicated processing unit 112-2, a request from application 122 for access to the first storage area of the first dedicated processing unit 112-1.

Instead of the explicit data migration as described above, in some embodiments, before the application 122 executed on the first dedicated processing unit 112-1, the migration module 210 may uniformly allocate different storage addresses (respectively referred to as a "third storage address" and a "fourth storage address") for the first memory of the first dedicated processing unit 112-1 and the second memory of the second dedicated processing unit 112-2. These storage addresses are accessible to both the first dedicated processing unit 112-1 and the second dedicated processing unit. In this case, the second dedicated processing unit 112-2 may remotely access the first memory of the first dedicated processing unit 112-1 as needed so that the application 122 may be restored more quickly on the second dedicated processing unit 112-2, thereby further improving the system performance.

As an example, the migration module 210 may uniformly configure virtual pointers indicating the third and fourth storage addresses by means of a GPU-based unified memory architecture (UMA). These virtual pointers may be accessible to the first and second dedicated processing units 112-1 and 112-2 or even other dedicated processing units and the CPU in the machine 110. The configured virtual pointers may be returned to the client 120. Subsequently, the client 120 may access storage resources on the first and second dedicated processing units 112-1 and 112-2 directly using the virtual pointers. As such, no matter which of the dedicated processing units 112, the application 122 on the client 120 is executed on it is transparent to the client 120, although there may be performance differences depending on the localization of the data, for example.

In the scenario of remotely accessing data on demand, after the application 122 is restored on the second dedicated processing unit 112-2, the second dedicated processing unit 112-2 may access the first memory remotely via an internal bus (such as a PCIe bus) after receiving the request from application 122 for access to the storage addresses in the first memory of the first dedicated processing unit 112-1. Subsequently, to further improve the speed of data access, the explicit data migration as described above may also be performed.

Figure 4:
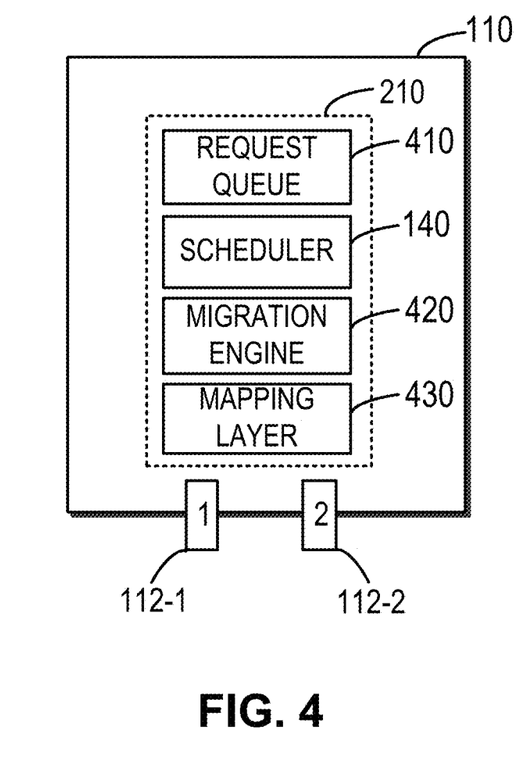
FIG. 4 illustrates a block diagram of a migration module in accordance with some embodiments of the present disclosure.

FIG. 4 illustrates an example block diagram of a migration module 210 in accordance with some embodiments of the present disclosure. As shown, the migration module 210 includes a request queue 410. All the requests from the client 120/application 122 are stored in the request queue 410 based on the queue model. In this example, the scheduler 140 is arranged in the migration module 210 for scheduling among the dedicated processing units 112 at the machine 110 locally so as to achieve the reallocation and the load balance of the dedicated processing units 112 locally.

The migration module 210 further includes a migration engine 420. The migration engine can perform operations and acts of the migration module 210 as described above with reference to FIG. 3. For example, after the migration engine 420 intercepts all the requests from the client 120/application 122, the migration engine 420 may store these requests in the request queue 410. The migration engine 420 may also receive a migration request from the scheduler 140 to trigger the migration of the application 122.

In this example, the migration module 210 further includes a mapping layer 430 for processing any semantic-level (re-)mapping related to context, descriptor and the like. In addition, at the bottom layer, the migration module 210 may include a device runtime library or driver and the like (not shown).

Figure 5:
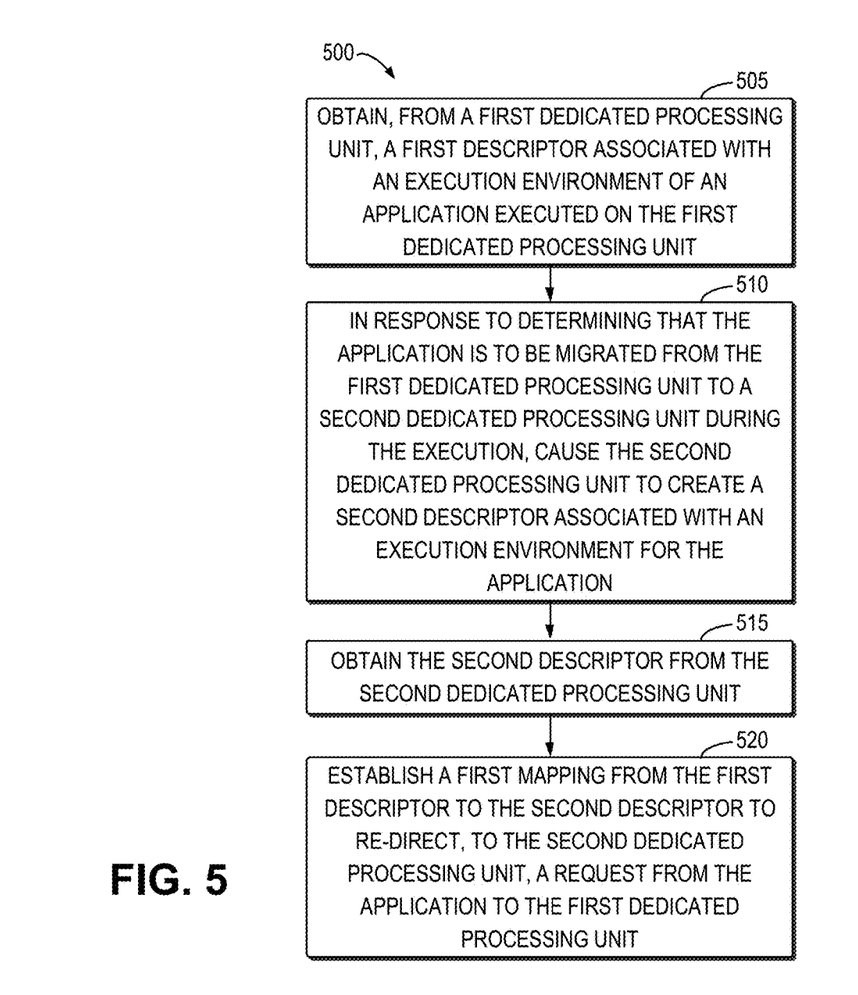
FIG. 5 illustrates a flowchart of a method in accordance with some embodiments of the present disclosure.

FIG. 5 illustrates a flowchart of an example method 500 in accordance with some embodiments of the present disclosure. The method 500 can be implemented at the migration module 210 as shown in FIG. 2. For the purpose of discussion, the method 500 will be described below in detail with reference to FIGS. 2-4.

As illustrated, at block 505, the migration module 210 obtains, from the first dedicated processing unit 112-1, the first descriptor associated with the runtime environment of the application 122 executed on the first dedicated processing unit 112-1. At block 510, in response to determining that the application 122 is to be migrated from the first dedicated processing unit 112-1 to the second dedicated processing unit 112-2 during the execution, the migration module 210 causes the second dedicated processing unit 112-2 to create the second descriptor associated with the runtime environment for the application 122. At block 515, the migration module 210 obtains the second descriptor from the second dedicated processing unit 112-2. At block 520, the migration module 210 establishes the first mapping from the first descriptor to the second descriptor to re-direct, to the second dedicated processing unit 112-2, the request from the application 122 to the first dedicated processing unit 112-1.

In some embodiments, after the first mapping is established, in response to intercepting a request from the application 122 to the first dedicated processing unit 112-1, the migration module 210 may re-direct the request to the second dedicated processing unit 112-2 based on the first mapping.

In some embodiments, in response to determining that the application 122 is to be migrated to the second dedicated processing unit 112-2, the migration module 210 may intercept the request from the application 122 to the first dedicated processing unit 112-1. Subsequently, the migration module 210 may freeze the intercepted request. In response to the establishment of the first mapping, the migration module 210 may forward the frozen request to the second dedicated processing unit 112-2.

In some embodiments, in response to determining that application 122 is to be migrated from the first dedicated processing unit 112-1 to the second dedicated processing unit 112-2, the migration module 210 may cause the first dedicated processing unit 112-1 to synchronize a plurality of threads associated with the application 122. In response to the completion of the synchronization, the migration module 210 may migrate data associated with the application 122 stored in the first memory for the first dedicated processing unit 112-1 into the second memory for the second dedicated processing unit 112-2. In some embodiments, the migration module 210 may create a synchronization barrier for the first dedicated processing unit 112-1 to cause the first dedicated processing unit 112-1 to perform the synchronization of the threads.

In some embodiments, the migration module 210 may determine the size of the first storage area for storing data in the first memory. Then, the migration module 210 may cause the second dedicated processing unit 112-2 to allocate the second storage area for storing data in the second memory based on the size of the first storage area. In response to determining that the second storage area is allocated, the migration module 210 may migrate the data from the first storage area to the second storage area.

In some embodiments, the migration module 210 may obtain the first storage address associated with the first storage area from the first dedicated processing unit 112-1 and obtain the second storage address associated with the second storage area from the second dedicated processing unit 112-2. Then, the migration module 210 may establish the second mapping from the first storage address to the second storage address, to re-direct, to the second storage area, the request from the application 122 for access to the first storage area.

In some embodiments, before the application 122 is executed on the first dedicated processing unit 112-1, the migration module 210 may allocate a third storage address to the first memory for the first dedicated processing unit 112-1 and a fourth storage address different from the third storage address to the second memory for the second dedicated processing unit 112-2. The third and fourth storage addresses are accessible to both the first and second dedicated processing units 112-1 and 112-2.

Figure 6:
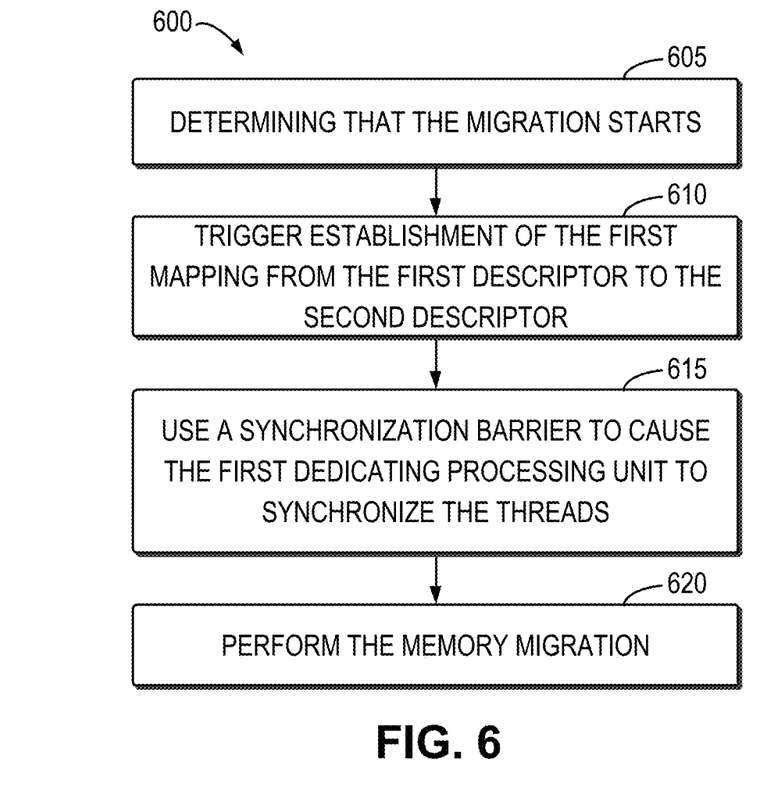
FIG. 6 illustrates a flowchart of a method in accordance with some other embodiments of the present disclosure.

FIG. 6 illustrates a flowchart of an example method 600 in accordance with some embodiments of the present disclosure. The method 600 can be implemented at the migration module 210 in the computing system 200 as shown in FIG. 2. For the purpose of discussion, the method 600 will be described below in detail with reference to FIGS. 2-4.

As illustrated, at block 605, the migration module 210 determines that the migration starts. For example, based on configurable migration policies, such as too high GPU utilization or unsatisfied QoS requirements of the application, a migration request may be sent by the scheduler 140 to the migration module 210 in the computing system 200 to launch the migration. The migration request may indicate the application 122 to be migrated and the second dedicated processing unit 112-2 as the migration destination.

At block 610, the migration module 210 triggers the establishment of the first mapping from the first descriptor to the second descriptor. In the embodiment where the migration module 210 intercepts all the requests to the dedicated processing units 112 in the machine 110, the triggering may be performed by separate threads. Alternatively, the triggering may be performed when the next request is intercepted. All the intercepted requests may be frozen temporarily in the request queue 410 shown in FIG. 4.

At block 615, the migration module 210 may use a synchronization barrier to cause the first dedicated processing unit 112-1 to synchronize the threads associated with the application 122 so that all the threads will run to the barrier. After the synchronization is completed, all the states associated with the application will be synchronized into the first memory of the first dedicated processing unit 112-1.

At block 620, the migration module 210 performs the memory migration. For example, the explicit memory replication or prefetching may be performed as described above. After the memory migration is completed, the application 122 may be restored on the second dedicated processing unit 112-2. Next, all the requests stored in the request queue 410 will be moved to the second dedicated processing unit 112-2 and the new request will be re-directed to the second dedicated processing unit 112-2. If necessary, a new round of migration may be performed for the application 122 executed on the second dedicated processing unit 112-2.

It is to be understood that the operation of establishing by the migration module 210 the first mapping from the first descriptor to the second descriptor is shown in FIG. 6 and it is to be performed prior to the thread synchronization only for purpose of illustration, without suggesting any limitation. In some embodiments, the establishment of the first mapping and the synchronization of the threads may be performed in parallel, or the establishment of the first mapping may be performed subsequent to the synchronization of the threads.

Figure 7:
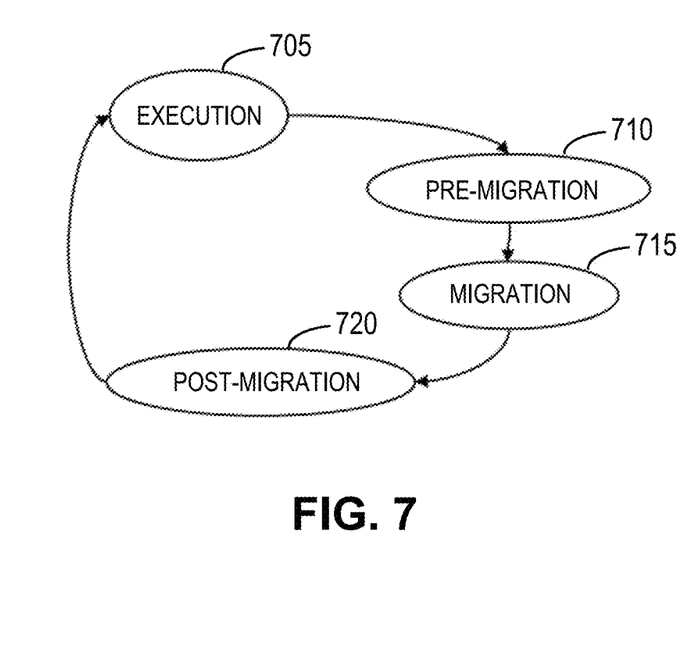
FIG. 7 illustrates a state transition flow of an application during a migration process in accordance with some embodiments of the present disclosure.

FIG. 7 illustrates an example state transition flowchart of the application 122 during the migration of the application 122 in accordance with some embodiments of the present disclosure.

When the application 122 is executed on the first dedicated processing unit 112-1, the state of the application 122 may be marked as "execution" 705. After the migration module 210 triggers the establishment of the first mapping from the first descriptor to the second descriptor, the state of the application 122 may be marked as "pre-migration" 710. After the threads running on the first dedicated processing unit 112-1 and associated with the application 122 are synchronized, the state of the application 122 may be marked as "migration" 715. In the case that the memory migration is not performed and the second dedicated processing unit 112-2 remotely accesses the first memory of the first dedicated processing unit 112-1 on demand, after the application 122 is restored on the second dedicated processing unit 112-2, the state of the application 122 may be marked as "post-migration" 720. After the memory migration is completed, the state of the application 122 may be marked as "execution" 705.

It is to be understood that the operations and features performed by the migration module 210 and the components thereof described above with reference to FIGS. 2-4 are also applicable to the methods 500 and 600 and have the same effects, and the details will not be repeated here.

Figure 8:
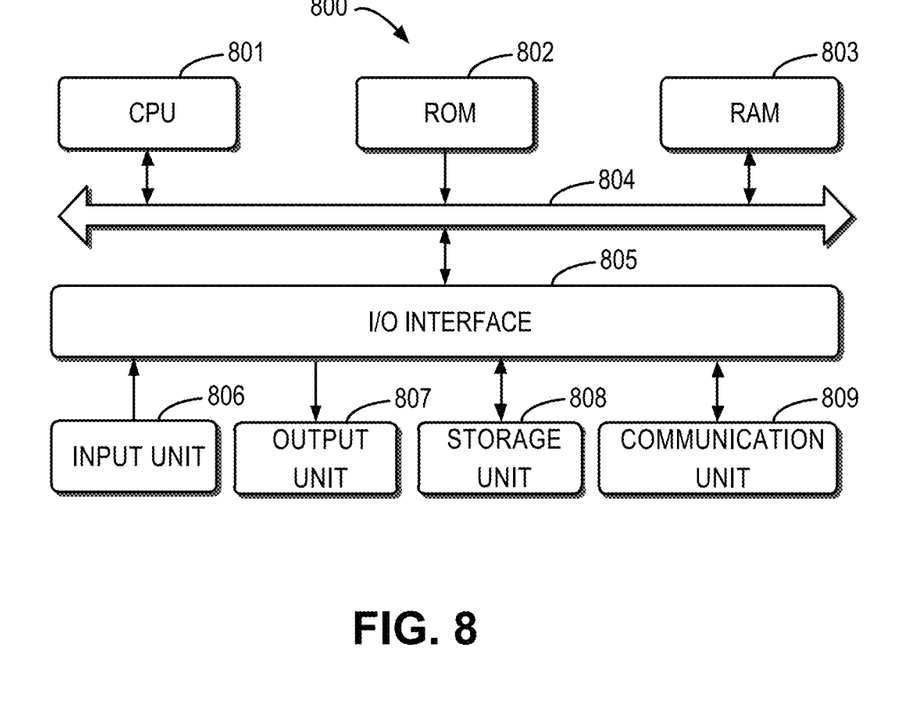
FIG. 8 illustrates a block diagram of a machine suitable to implement embodiments of the present disclosure.

FIG. 8 illustrates a schematic block diagram of a machine 800 that can be used to implement embodiments of the present disclosure. As illustrated in FIG. 8, the machine 800 includes a controller or a central processing unit (CPU) 801 which can execute various appropriate actions and processing based on the computer program instructions stored in a read-only memory (ROM) 802 or the computer program instructions loaded into a random access memory (RAM) 803. The ROM 802 and/or RAM 803 may store all kinds of programs and data required for the operation of the machine 800. The CPU 801, ROM 802 and RAM 803 are connected to each other via a bus 804. Particularly, the machine 800 may further include one or more dedicated processing units (not shown) which can be connected to the bus 804.

The input/output (I/O) interface 805 is also connected to the bus 804. A plurality of components in the machine 800 are connected to the I/O interface 805, including: an input unit 806, such as keyboard, mouse and the like; an output unit 807, such as various types of displays, loudspeakers and the like; a storage unit 808, such as a magnetic disk, an optical disk and the like; and a communication unit 809, such as a network card, modem, a wireless communication transceiver and the like. The communication unit 809 allows the machine 800 to exchange information/data with other devices through computer networks such as Internet and/or various telecommunication networks. In particular, in embodiments of the present disclosure, the communication unit 809 allows communication with the client 120 or other machines.

In some embodiments, the CPU 801 may be configured to perform various procedures or processes described above, such as the process 300 and the methods 500 and 600. For example, in some embodiments, the process 300 or the methods 500 and 600 can be implemented by computer software programs, which are tangibly included in a machine-readable medium, such as the storage unit 808. In some embodiments, the computer program can be partially or completely loaded and/or installed to the machine 800 via the ROM 802 and/or the communication unit 809. When the computer program is loaded to the RAM 803 and executed by CPU 801, one or more steps of the above described process 300 or the method 500 or 600 are implemented. Alternatively, in other embodiments, the CPU 801 may also be configured to implement the above process/method in any other suitable manner.

Particularly, according to embodiments of the present disclosure, the process described above with reference to FIGS. 2-7 may be implemented by a computer program product which may be tangibly stored on a non-transient computer readable storage medium and includes computer-executable instructions, and the instructions, when executed, cause the machine to implement various aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

Various embodiments of the present disclosure have been described for the purpose of illustration. However, the present disclosure is not intended to be limited to these disclosed embodiments. All the modifications and variations fall under the scope of protection defined by the claims without departing from the essentials of the present disclosure.

We claim:
1. A method of application migration, comprising:
obtaining, from a first dedicated processing unit, a first descriptor associated with a first runtime environment of an application executed on the first dedicated processing unit;
in response to determining that the application is to be migrated from the first dedicated processing unit to a second dedicated processing unit during the execution, causing the second dedicated processing unit to create a second descriptor associated with a second runtime environment for the application, executed on the second dedicated processing unit;
obtaining the second descriptor from the second dedicated processing unit; and
establishing a first mapping from the first descriptor to the second descriptor to re-direct, to the second dedicated processing unit, a request from the application to the first dedicated processing unit.
2. The method according to claim 1, further comprising:
after the first mapping has been established, in response to intercepting the request from the application to the first dedicated processing unit, re-directing the request to the second dedicated processing unit based on the first mapping.
3. The method according to claim 1, further comprising:
in response to determining that the application is to be migrated to the second dedicated processing unit, intercepting the request from the application to the first dedicated processing unit;
freezing the intercepted request; and
in response to the first mapping having been established, forwarding the frozen request to the second dedicated processing unit.
4. The method according to claim 1, further comprising:
in response to determining that the application is to be migrated from the first dedicated processing unit to the second dedicated processing unit, causing the first dedicated processing unit to synchronize a plurality of threads associated with the application; and
in response to completion of the synchronization, migrating data associated with the application and stored in a first memory for the first dedicated processing unit to a second memory for the second dedicated processing unit.
5. The method according to claim 4, wherein causing the first dedicated processing unit to synchronize the plurality of threads comprises:
creating a synchronization barrier for the first dedicated processing unit.
6. The method according to claim 4, wherein migrating the data to the second memory comprises:
determining a size of a first storage area for storing the data in the first memory;
causing the second dedicated processing unit to allocate a second storage area for storing the data in the second memory based on the size of the first storage area; and
in response to determining that the second storage area has been allocated, migrating the data from the first storage area to the second storage area.

7. The method according to claim 6, further comprising:
obtaining, from the first dedicated processing unit, a first storage address associated with the first storage area;
obtaining, from the second dedicate processing unit, a second storage address associated with the second storage area; and
establishing a second mapping from the first storage address to the second storage address to re-direct, to the second storage area, an access request from the application to the first storage area.

8. The method according to claim 7, further comprising:
before the application runs on the first dedicated processing unit, allocating a third storage address to a first memory for the first dedicated processing unit; and
allocating a fourth storage address different from the third storage address to a second memory for the second dedicated processing unit, the third and fourth storage addresses being accessible to both the first and second dedicated processing units.

9. A machine for application migration, comprising:
a central processing unit, and
a memory storing instructions, the instructions, when executed by the central processing unit, cause the central processing unit to perform acts comprising:
obtaining, from a first dedicated processing unit, a first descriptor associated with a first runtime environment of an application executed on the first dedicated processing unit;
in response to determining that the application is to be migrated from the first dedicated processing unit to a second dedicated processing unit during the execution, causing the second dedicated processing unit to create a second descriptor associated with a second runtime environment for the application, executed on the second dedicated processing unit;
obtaining the second descriptor from the second dedicated processing unit; and
establishing a first mapping from the first descriptor to the second descriptor to re-direct, to the second dedicated processing unit, a request from the application to the first dedicated processing unit.

10. The machine according to claim 9, wherein the acts further comprise:
after the first mapping has been established, in response to intercepting the request from the application to the first dedicated processing unit, re-directing the request to the second dedicated processing unit based on the first mapping.

11. The machine according to claim 9, wherein the acts further comprise:
in response to determining that the application is to be migrated to the second dedicated processing unit, intercepting the request from the application to the first dedicated processing unit;
freezing the intercepted request; and
in response to the first mapping having been established, forwarding the frozen request to the second dedicated processing unit.

12. The machine according to claim 9, wherein the acts further comprise:
in response to determining that the application is to be migrated from the first dedicated processing unit to the second dedicated processing unit, causing the first dedicated processing unit to synchronize a plurality of threads associated with the application; and
in response to completion of the synchronization, migrating data associated with the application and stored in a first memory for the first dedicated processing unit to a second memory for the second dedicated processing unit.

13. The machine according to claim 12, wherein causing the first dedicated processing unit to synchronize the plurality of threads comprises:
creating a synchronization barrier for the first dedicated processing unit.

14. The machine according to claim 12, wherein migrating the data to the second memory comprises:
determining a size of a first storage area for storing the data in the first memory;
causing the second dedicated processing unit to allocate a second storage area for storing the data in the second memory based on the size of the first storage area; and
in response to determining that the second storage area has been allocated, migrating the data from the first storage area to the second storage area.

15. The machine according to claim 14, wherein the acts further comprise:
obtaining, from the first dedicated processing unit, a first storage address associated with the first storage area;
obtaining, from the second dedicate processing unit, a second storage address associated with the second storage area; and
establishing a second mapping from the first storage address to the second storage address to re-direct, to the second storage area, an access request from the application to the first storage area.

16. The machine according to claim 15, wherein the acts further comprise:
before the application runs on the first dedicated processing unit, allocating a third storage address to a first memory for the first dedicated processing unit; and
allocating a fourth storage address different from the third storage address to a second memory for the second dedicated processing unit, the third and fourth storage addresses being accessible to both the first and second dedicated processing units.

17. A non-transient computer readable medium having machine executable instructions tangibly stored thereon, the machine executable instructions, when executed in a machine, causing the machine to perform:
obtaining, from a first dedicated processing unit, a first descriptor associated with a first runtime environment of an application executed on the first dedicated processing unit;
in response to determining that the application is to be migrated from the first dedicated processing unit to a second dedicated processing unit during the execution, causing the second dedicated processing unit to create a second descriptor associated with a second runtime environment for the application, executed on the second dedicated processing unit;
obtaining the second descriptor from the second dedicated processing unit; and
establishing a first mapping from the first descriptor to the second descriptor to re-direct, to the second dedicated processing unit, a request from the application to the first dedicated processing unit.

18. The non-transient computer readable medium according to claim 17, further comprising:
after the first mapping has been established, in response to intercepting the request from the application to the first dedicated processing unit, re-directing the request to the second dedicated processing unit based on the first mapping.

19. The non-transient computer readable medium according to claim 17, further comprising:
   in response to determining that the application is to be migrated to the second dedicated processing unit, intercepting the request from the application to the first dedicated processing unit;
   freezing the intercepted request; and
   in response to the first mapping having been established, forwarding the frozen request to the second dedicated processing unit.

20. The non-transient computer readable medium according to claim 17, further comprising:
   in response to determining that the application is to be migrated from the first dedicated processing unit to the second dedicated processing unit, causing the first dedicated processing unit to synchronize a plurality of threads associated with the application; and
   in response to completion of the synchronization, migrating data associated with the application and stored in a first memory for the first dedicated processing unit to a second memory for the second dedicated processing unit.

* * * * *